United States Patent
Lu et al.

(10) Patent No.: US 12,408,124 B2
(45) Date of Patent: Sep. 2, 2025

(54) UTILIZING DEVICE STATE INFORMATION IN SIMULTANEOUS RADIO TRANSMISSION SCENARIOS FOR RADIO FREQUENCY (RF) EXPOSURE COMPLIANCE

(71) Applicant: QUALCOMM Incorporated, San Diego, CA (US)

(72) Inventors: Lin Lu, San Diego, CA (US); Jagadish Nadakuduti, Bermuda Dunes, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 18/051,847

(22) Filed: Nov. 1, 2022

(65) Prior Publication Data

US 2023/0138665 A1 May 4, 2023

Related U.S. Application Data

(60) Provisional application No. 63/263,389, filed on Nov. 2, 2021.

(51) Int. Cl.
*H04W 52/36* (2009.01)
*H04W 52/42* (2009.01)

(52) U.S. Cl.
CPC ......... *H04W 52/367* (2013.01); *H04W 52/42* (2013.01)

(58) Field of Classification Search
None
See application file for complete search history.

(56) References Cited

U.S. PATENT DOCUMENTS

| 2014/0274190 A1 | 9/2014 | Lu et al. |
| 2017/0064641 A1 | 3/2017 | Logan et al. |
| 2017/0273033 A1 | 9/2017 | Lee et al. |

(Continued)

FOREIGN PATENT DOCUMENTS

WO 2020010232 A1 1/2020

OTHER PUBLICATIONS

Apple: "UL Gaps for TX Power Management", 3GPP TSG-RAN WG4 Meeting #98-bis-e, R4-2104849, 3rd Generation Partnership Project, Mobile Competence Centre, 650, Route Des Lucioles, F-06921 Sophia-Antipolis Cedex, France, vol. RAN WG4, No. Electronic Meeting, Apr. 12, 2021-Apr. 20, 2021, Apr. 2, 2021, XP052175859, 14 Pages, Retrieved on Apr. 2, 2021, p. 2, Paragraph 2.1.

(Continued)

*Primary Examiner* — Christine T Duong
(74) *Attorney, Agent, or Firm* — Patterson & Sheridan, L.L.P/Qualcomm Incorporated

(57) ABSTRACT

Certain aspects of the present disclosure provide techniques and apparatus for radio frequency (RF) exposure compliance using device state information (e.g., a device state index (DSI)). Certain aspects may utilize the device information in simultaneous radio transmission scenarios, such as for simultaneous sub-6 GHz and millimeter wave (mmWave) radio transmission scenarios. In some transmission scenarios, the device state information may be applied in real time to account for a lower mmWave RF exposure contribution to the total RF exposure, thereby providing for potentially increased transmission power from the sub-6 GHz radio.

30 Claims, 7 Drawing Sheets

(56) References Cited

U.S. PATENT DOCUMENTS

| | | | |
|---|---|---|---|
| 2018/0288709 A1* | 10/2018 | Yao | H04W 52/367 |
| 2020/0015171 A1 | 1/2020 | Nadakuduti et al. | |
| 2023/0012055 A1* | 1/2023 | Zhang | H01Q 1/245 |
| 2023/0127758 A1* | 4/2023 | Ramasamy | G06F 21/62 |
| | | | 726/26 |

OTHER PUBLICATIONS

International Search Report and Written Opinion—PCT/US2022/079114—ISA/EPO—Feb. 24, 2023.

* cited by examiner

UTILIZING DEVICE STATE INFORMATION IN SIMULTANEOUS RADIO TRANSMISSION SCENARIOS FOR RADIO FREQUENCY (RF) EXPOSURE COMPLIANCE

CROSS-REFERENCE TO RELATED APPLICATION(S)

This application claims the benefit of priority to U.S. Provisional Application No. 63/263,389, entitled "Utilizing Device State Information in Simultaneous Radio Transmission Scenarios for Radio Frequency (RF) Exposure Compliance" and filed Nov. 2, 2021, which is expressly incorporated by reference herein in its entirety as if fully set forth below and for all applicable purposes.

BACKGROUND

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless communication devices (such as cellular telephones) are generally mandated to meet radio frequency (RF) exposure limits set by domestic and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device in real time and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure generally relate to techniques and apparatus for utilizing device state information to comply with radio frequency (RF) exposure limits in wireless communication transmissions.

Certain aspects of the present disclosure provide a method of wireless communication by a wireless device. The method generally includes determining a first RF exposure for a first frequency band; determining a second RF exposure for a second frequency band based on a first distance; adjusting a value of the second RF exposure based on a second distance; determining a first transmit power limit for the first frequency band based on an RF exposure limit, the first RF exposure, and the adjusted value of the second RF exposure; and transmitting a signal in the first frequency band based on the first transmit power limit.

Certain aspects of the present disclosure provide an apparatus for wireless communication. The apparatus includes a memory, at least one processor coupled to the memory, and a transmitter coupled to the at least one processor. The at least one processor is generally configured to: determine a first RF exposure for a first frequency band; determine a second RF exposure for a second frequency band based on a first distance; adjust a value of the second RF exposure based on a second distance; and determine a first transmit power limit for the first frequency band based on an RF exposure limit, the first RF exposure, and the adjusted value of the second RF exposure. The transmitter is configured to transmit a signal in the first frequency band based on the first transmit power limit.

Certain aspects of the present disclosure provide an apparatus for wireless communication. The apparatus generally includes means for determining a first RF exposure for a first frequency band; means for determining a second RF exposure for a second frequency band based on a first distance; means for adjusting a value of the second RF exposure based on a second distance; means for determining a first transmit power limit for the first frequency band based on an RF exposure limit, the first RF exposure, and the adjusted value of the second RF exposure; and means for transmitting a signal in the first frequency band based on the first transmit power limit.

Certain aspects of the present disclosure provide a non-transitory computer-readable medium comprising computer-executable instructions that, when executed by one or more processors of a processing system, cause the processing system to perform operations. The operations generally include determining a first RF exposure for a first frequency band; determining a second RF exposure for a second frequency band based on a first distance; adjusting a value of the second RF exposure based on a second distance; determining a first transmit power limit for the first frequency band based on an RF exposure limit, the first RF exposure, and the adjusted value of the second RF exposure; and transmitting a signal in the first frequency band based on the first transmit power limit.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
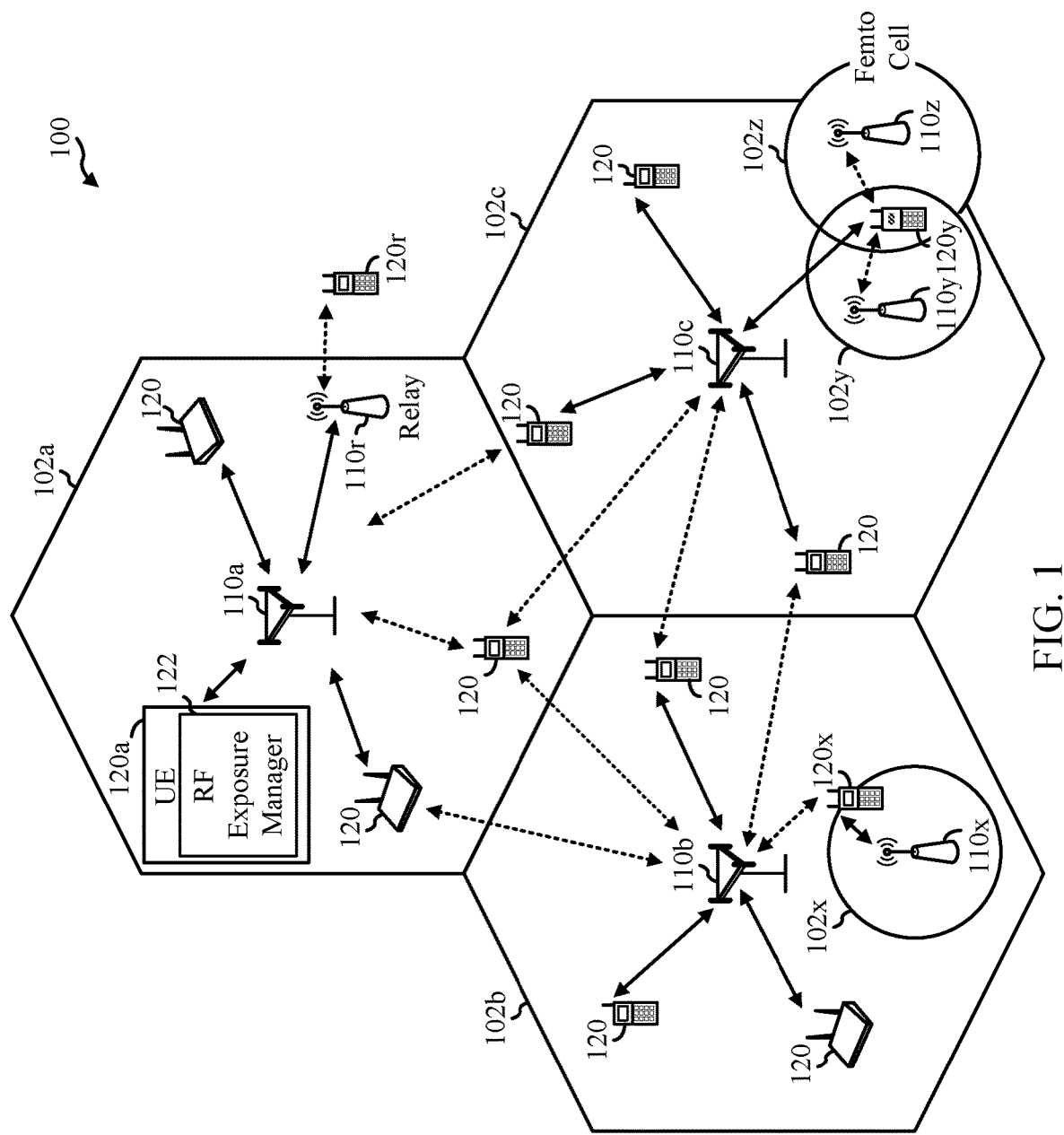
FIG. 1 is a block diagram conceptually illustrating an example wireless communication network, in accordance with certain aspects of the present disclosure.
Figure 1:
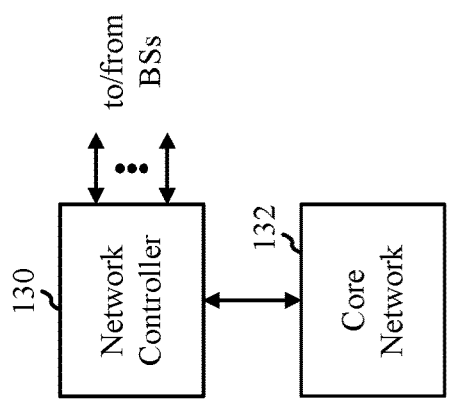

Aspects of the present disclosure provide apparatus, methods, processing systems, and computer-readable mediums for complying with radio frequency (RF) exposure using device state information (e.g., a device state index (DSI)). Certain aspects may utilize the device state information in simultaneous radio transmission scenarios, such as for simultaneous sub-6 GHz and millimeter wave (mmWave) radio transmission scenarios. In some transmission scenarios, the device state information may be applied in real time to more accurately account for a lower mmWave RF exposure contribution to the total RF exposure, thereby providing for potentially increased transmission power from the sub-6 GHz radio.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as IEEE 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming, and beam direction may be dynamically configured. MIMO transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

As shown in FIG. 1, the UE 120a includes an RF exposure manager 122 that enforces RF composure compliance using device state information (e.g., device state index (DSI)) in real time, in accordance with aspects of the present disclosure.

Figure 2:
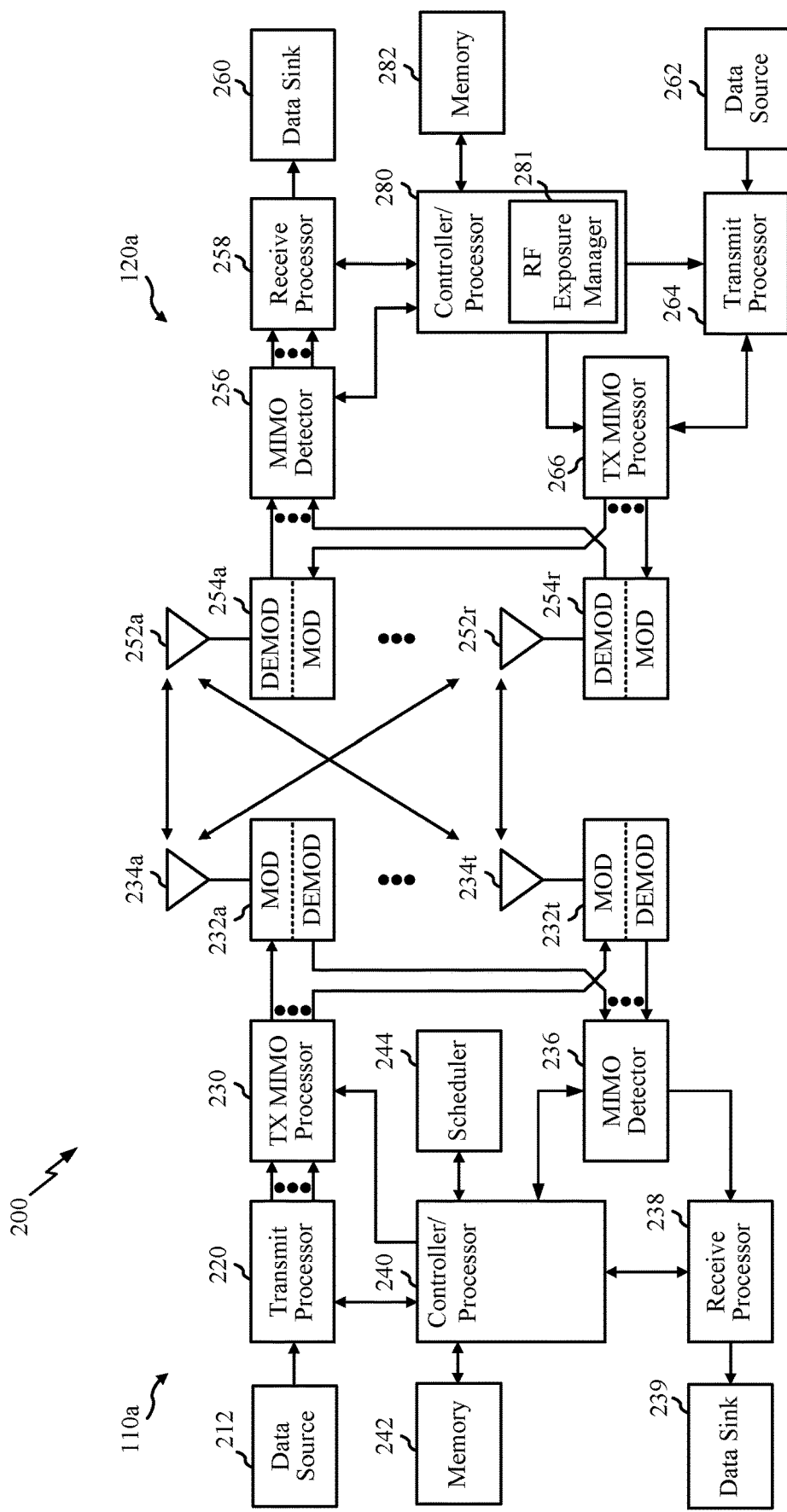
FIG. 2 is a block diagram conceptually illustrating a design of an example a base station (BS) and user equipment (UE), in accordance with certain aspects of the present disclosure.

FIG. 2 illustrates example components of the BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input, multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 254a-254r may further process the input samples (e.g., for OFDM, etc.) to obtain received symbols. A MIMO detector 256 may obtain received symbols from the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that enforces RF composure compliance using device state information (e.g., device state index (DSI)) in real time, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120*a* is described with respect to FIGS. 1 and 2 as communicating with a BS and/or within a network, the UE 120*a* may be configured to communicate directly with/transmit directly to another UE 120, or with/to another wireless device without relaying communications through a network. In some embodiments, the BS 110*a* illustrated in FIG. 2 and described above is an example of another UE 120.

Example RF Transceiver

Figure 3:
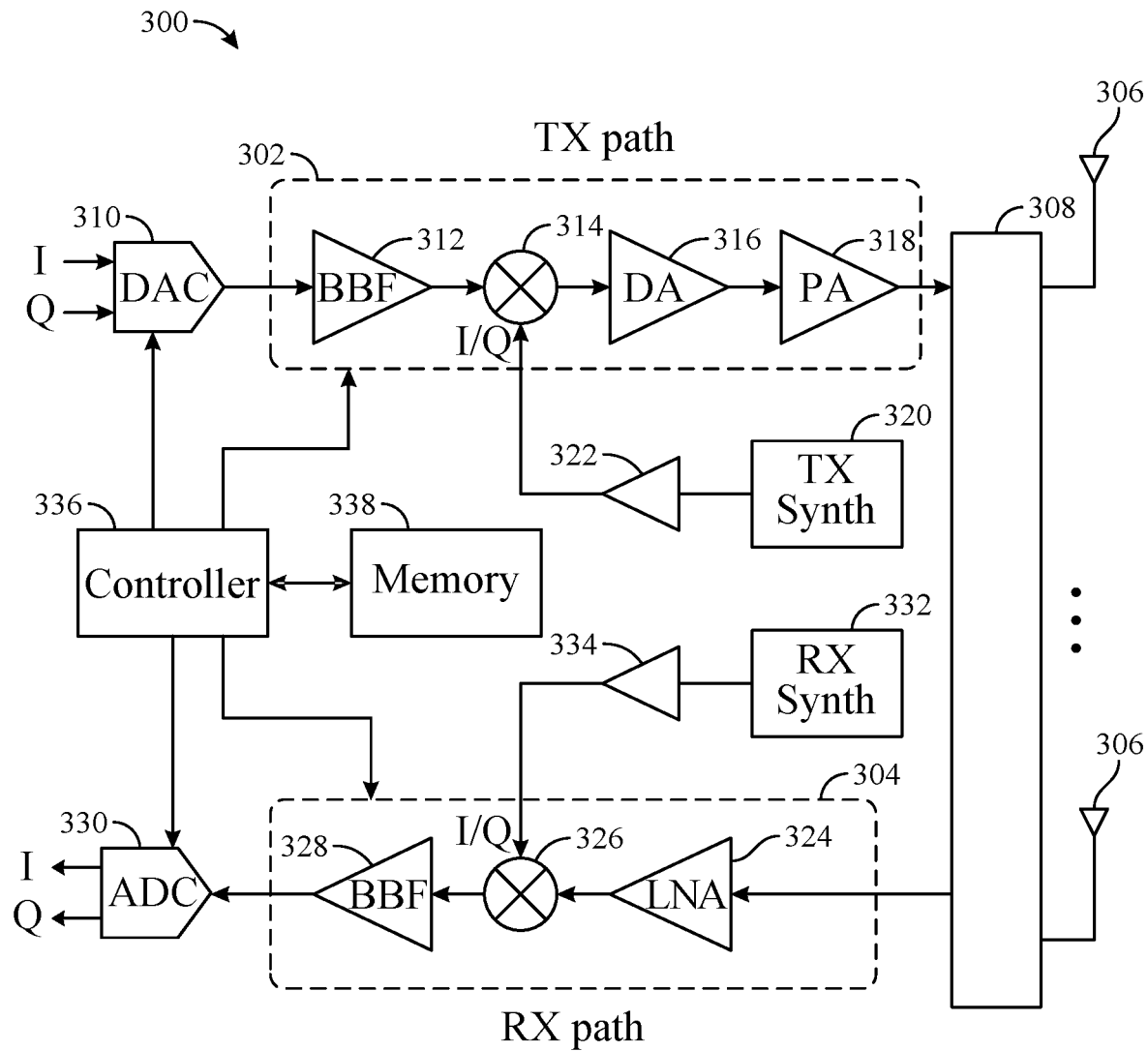
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine time-averaged RF exposure measurements based on transmission power levels applied to the TX path 302 (e.g., certain levels of gain applied to the BBF 312, the DA 316, and/or the PA 318) to set a transmission power level that complies with an RF exposure limit set by domestic regulations and international standards as further described herein.

Example RF Exposure Measurement

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm$^2$. In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), wireless local area network (WLAN) (e.g., IEEE 802.11a/b/g/n/ac/ax), Bluetooth, non-terrestrial network (NTN), etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, WLAN, Bluetooth, NTN, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 to 6,000 MHz in some examples, and may include bands in the 6,000 MHz and/or 7,000 MHz range in some examples.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 282 of FIG. 2 or memory 338 of FIG. 3). Each of the SAR distributions may correspond to a respective one of multiple transmission scenarios supported by the wireless communication device for the first technology. The transmission scenarios may correspond to various combinations of antennas (e.g., antennas 252a through 252r of FIG. 2 or antenna 306 of FIG. 3), frequency bands, channels, and/or body positions, as discussed further below. In some examples, one or more of the SAR distributions include a single value (e.g., a peak value determined based on the description below, or a sum of peak values).

The SAR distribution (also referred to as a "SAR map") for each transmission scenario may be generated based on measurements (e.g., E-field measurements) performed in a test laboratory using a model of a human body. After the SAR distributions are generated, the SAR distributions are stored in the memory to enable a processor (e.g., processor 280 of FIG. 2 or controller 336 of FIG. 3) to assess RF exposure in real time, as discussed further below. Each SAR distribution may include a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmission scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmission scenarios for the first technology. In certain aspects, the transmission scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter (e.g., a DSI) indicating the location of the wireless communication device relative to the user's body location (head, trunk, away from the body, etc.), and/or other parameters. In cases where the wireless communication device supports a large number of transmission scenarios, it may be very time-consuming and expensive to perform measurements for each transmission scenario in a test setting (e.g., test laboratory). To reduce test time, measurements may be performed for a subset of the transmission scenarios to generate SAR distributions for the subset of transmission scenarios. In this example, the SAR distribution for each of the remaining transmission scenarios may be generated by combining two or more of the SAR distributions for the subset of transmission scenarios, as discussed further below.

For example, SAR measurements may be performed for each one of the antennas to generate a SAR distribution for each one of the antennas. In this example, a SAR distribution for a transmission scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmission scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmission scenario may be generated by combining two or more normalized SAR distributions. For example, a normalized SAR distribution for a transmission scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SARA_{lim}$ is a SAR limit, $SAR_{norm\_combined}$ is the combined normalized SAR distribution for simultaneous transmission from the active antennas, i is an index for the active antennas, SARI is the SAR distribution for the $i^{th}$ active antenna, $Tx_i$ is the transmission power level for the $i^{th}$ active antenna, $TX_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \qquad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution may be obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2. \qquad (3b)$$

In another example, normalized SAR distributions for different frequency bands may be stored in the memory. In this example, a normalized SAR distribution for a transmission scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11 ay, etc.), the wireless communication device may include multiple PD distributions for the second technology stored in the memory (e.g., memory 282 of FIG. 2 or memory 338 of FIG. 3). Each of the PD distributions may correspond to a respective one of multiple transmission scenarios supported by the wireless communication device for the second technology. The transmission scenarios may correspond to various combinations of antennas (e.g., antennas 252a through 252r of FIG. 2 or antenna 306 of FIG. 3), frequency bands, channels, and/or body positions, as discussed further below. In some examples, one or more of the PD distributions include a single value (e.g., a peak value determined based on the description below, or a sum of peak values).

The PD distribution (also referred to as a "PD map") for each transmission scenario may be generated based on measurements (e.g., E-field measurements) performed in a test laboratory using a model of a human body. After the PD distributions are generated, the PD distributions are stored in the memory to enable the processor (e.g., processor 280 of FIG. 2 or controller 336 of FIG. 3) to assess RF exposure in real time, as discussed further below. Each PD distribution may include a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \qquad (4)$$

where $Tx_c$ is a current transmission power level for the respective transmission scenario, and $Tx_{PD}$ is the transmission power level corresponding to the PD values in the PD distribution (e.g., the transmission power level at which the PD values were measured in the test laboratory).

As discussed above, the wireless communication device may support multiple transmission scenarios for the second technology. In certain aspects, the transmission scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter (e.g., a DSI) indicating the location of the wireless communication device relative to the user's body location (head, trunk, away from the body, etc.), and/or other parameters. In cases where the wireless communication device supports a large number of transmission scenarios, it may be very time-consuming and expensive to perform measurements for each transmission scenario in a test setting (e.g., test laboratory). To reduce test time, measurements may be performed for a subset of the transmission scenarios to generate PD distributions for the subset of transmission scenarios. In this example, the PD distribution for each of the remaining transmission scenarios may be generated by combining two or more of the PD distributions for the subset of transmission scenarios, as discussed further below.

For example, PD measurements may be performed for each one of the antennas to generate a PD distribution for each one of the antennas. In this example, a PD distribution for a transmission scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmission scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmission scenario may be generated by combining two or more normalized PD distributions. For example, a normalized PD distribution for a transmission scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \qquad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $TX_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \qquad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution may be obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \qquad (6b)$$

In another example, normalized PD distributions for different frequency bands may be stored in the memory. In this example, a normalized PD distribution for a transmission scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $TX_{PDi}$ is the transmission power level for the normalized PD distribution for the $i^{th}$ active frequency band.

As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 280 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as described further below. In the present disclosure, the term "maximum allowable power level" refers to a maximum allowable power level imposed by an RF exposure limit unless stated otherwise. It is to be appreciated that the maximum allowable power level is not necessarily equal to the absolute maximum power level that complies with an RF exposure limit and may be less than the absolute maximum power level that complies with the RF exposure limit (e.g., to provide a safety margin). The maximum allowable power level may be used to set a power level limit on a transmission at a transmitter such that the power level of the transmission is not allowed to exceed the maximum allowable power level to ensure RF exposure compliance.

The processor 280 may determine the first and second maximum allowable power levels as follows: the processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a "combined normalized distribution" below). The value at each location in the combined normalized distribution may be determined by combining the normalized SAR value at the location with the normalized PD value at the location or another technique.

The processor 280 may then determine whether the first and second transmission power levels comply with RF exposure limits by comparing the peak value in the combined normalized distribution with one (1.0). If the peak value is equal to or less than one (i.e., satisfies the condition 1), then the processor 280 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 280 may determine that the first and second transmission power levels do not comply with RF exposure limits. The condition for RF exposure compliance for simultaneous transmissions using the first and second technologies may be given by:

$$SAR_{norm} + PD_{norm} \leq 1 \qquad (7).$$

Figure 4:
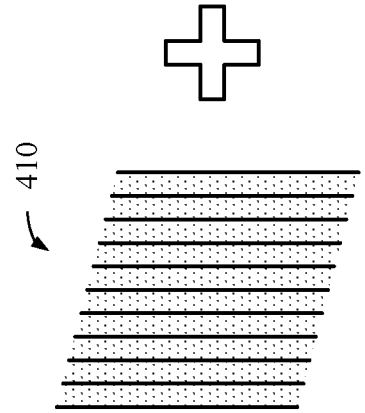
FIG. 4 is a diagram illustrating an example of a normalized specific absorption rate (SAR) distribution combined with a normalized power density (PD) distribution, in accordance with certain aspects of the present disclosure.
Figure 4:
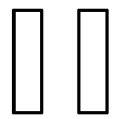
Figure 4:
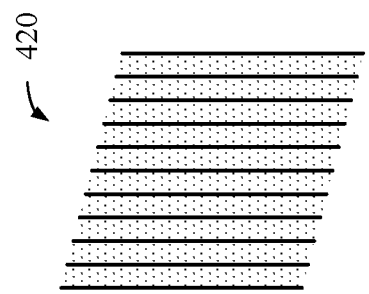
Figure 4:
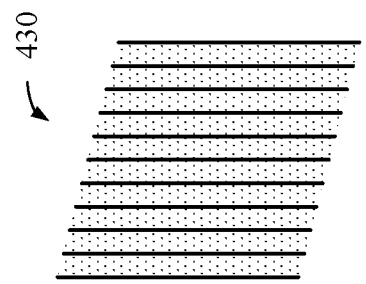

FIG. 4 is a diagram illustrating the normalized SAR distribution 410 and the normalized PD distribution 420, in which the normalized SAR distribution 410 and the normalized PD distribution 420 are combined to generate a combined normalized distribution 430. FIG. 4 also shows the condition that the peak value in the combined normalized distribution 430 be equal to or less than one for RF exposure compliance. Although each of the distributions 410, 420, and 430 is depicted as a two-dimensional distribution in FIG. 4, it is to be appreciated that the present disclosure is not limited to this example.

The normalized SAR distribution in Expression (7) may be generated by combining two or more normalized SAR distributions as discussed above (e.g., for a transmission scenario using multiple active antennas). Similarly, the normalized PD distribution in Expression (7) may be generated by combining two or more normalized PD distributions as discussed above (e.g., for a transmission scenario using multiple active antennas). In this case, the condition for RF exposure compliance in Expression (7) may be rewritten using Equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \quad (8)$$

For the MIMO case, Equations (3b) and (6b) may be combined instead. As shown in Expression (8), the combined normalized distribution may be a function of transmission power levels for the first technology and transmission power levels for the second technology. All the points in the combined normalized distribution should meet the normalized limit of one in Expression (8). Additionally, when combining SAR and PD distributions, the SAR and PD distributions should be aligned spatially or aligned with their peak locations so that the combined distribution given by Expression (8) represents combined RF exposure for a given position of a human body.

Example Utilization of Device State Information in Simultaneous Radio Transmissions Multi-mode/multi-band wireless devices (e.g., UEs) have multiple transmit antennas, which can simultaneously transmit in sub-6 GHz bands and bands greater than 6 GHz bands, such as mmWave (also referred to as simply "mmW") bands. As described herein, the RF exposure of sub-6 GHz bands may be evaluated in terms of SAR, whereas the RF exposure of bands greater than 6 GHz may be evaluated in terms of PD. Due to the regulations on simultaneous exposure, the wireless communication device may limit maximum transmit power for both sub-6 GHz bands and bands greater than 6 GHz.

To maximize transmission power, some RF exposure compliance algorithms may assess a time-averaged RF exposure over a given time window in real time to determine a maximum allowable average transmission power ($P_{limit}$). The wireless device may use this maximum allowable average transmission power ($P_{limit}$) as a baseline power level based on the active radio, antenna(s), and/or device state information (e.g., the device state index (DSI)). The DSI may indicate the device is in one of a group of predefined states, such as free space (e.g., no body is located near the device), head (e.g., the device is positioned near a user's head), body (e.g., the device is located near the user's body, other than the head or an extremity, such as the user's trunk), extremity (e.g., the device is located near a hand or finger), and hotspot (e.g., the device is being used as a hotspot).

For a given DSI, sub-6 GHz radio exposure may be assessed at a defined separation distance based on a typical use case. For example, hotspot DSI may be assessed at 10 mm, body DSI may be assessed at 15 mm, head DSI may be assessed against a head specific anthropomorphic mannequin (SAM) phantom, etc. Additionally, sub-6 GHz radio exposure may be assessed for specific surfaces of a wireless device. For example, head DSI may only be assessed with the front (display-side) surface of the wireless device because this is the intended usage surface next to the human head. Similarly, body DSI may only be assessed with front and back surfaces (e.g., for scenarios where the device is placed in a pocket, on a belt clip, in an armband, etc., such that human tissue would be present and primarily facing only one of those surfaces).

RF exposure for mmWave radio exposure relates to the average exposure over the surface of skin. Because a human finger can get close to the mmWave module, certain regulators currently mandate that mmWave exposure be assessed at a separation distance of 2 mm. In some cases, mmWave radio exposure may be evaluated on all device surfaces surrounding the mmWave module. For example, if the mmWave module is located on or near the left edge of the wireless device, then mmWave radio exposure may be evaluated on the left surface, front (display-side) surface, and back (battery-side) surfaces. In this example, top, bottom, and right surfaces are not assessed since these device surfaces are considered far away from the source of RF exposure (the mmWave module). However, if the mmWave module is located on or near the left edge towards the left-top corner of the wireless device, then the top surface may also be assessed (in addition to the left, front, and back surfaces).

In a simultaneous sub-6 GHz and mmWave transmission scenario, time-averaging algorithms may determine total RF exposure by summing up SAR exposure at a separation distance (10 mm, 15 mm, etc.) with PD exposure at a 2 mm separation distance (e.g., as described above with respect to FIG. 4) for the set of device surfaces for which SAR exposure was assessed (e.g., a subset of all surfaces). For example, a wireless device may calculate past transmitted time-averaged simultaneous RF exposure by adding the transmitted normalized time-averaged sub-6 GHz exposure to the transmitted normalized time-averaged mmWave exposure according to Equation (9) as follows:

$$\text{tot.time.avg.exp.past} = \text{sub6.norm.time.avg.exp(DSI)} + \text{mmW.norm.time.avg.exp.2 mm} \quad (9)$$

where tot.time.avg.exp.past is the past time-averaged simultaneous RF exposure, sub6.norm.time.avg.exp(DSI) is the normalized T1-averaged sub-6 GHz exposure for a particular DSI (or other device state) transmitted over the past (T1–Δt) seconds and is equal to (T1.avg.sub6.Tx.power)/(sub6_Plimit), mmW.norm.time.avg.exp is the normalized T2-averaged mmWave exposure transmitted over the past (T2–Δt) seconds and is equal to (T2.avg.mmW.Tx.power)/(mmW_Plimit), and sub6_Plimit and mmW_Plimit represent the maximum allowable average transmission power limit ($P_{limit}$) that corresponds to the RF exposure limit for sub-6 GHz and mmWave transmissions, respectively. T1 and T2 correspond to the averaging time windows of sub-6 GHz transmission and mmWave transmission, respectively, where the averaging time windows T1 and T2 are divided into time intervals of duration Δt, where Δt may be the same or different for T1 and T2.

Assuming a time window is divided into time intervals of duration Δt, the device may determine a margin available for a future time interval (future margin) so as to not exceed the normalized limit of 1.0 according to the following expression:

$$\begin{aligned}\text{total exposure in one time} \\ \text{window} = \text{tot.time.avg.exp.past} + \text{future margin} \leq 1.0\end{aligned} \quad (10)$$

such that future margin=1.0–[sub6.norm.time.avg.exp (DSI)+mmW.norm.time.avg.exp.2 mm].

As can be seen in the above approach, the sub-6 GHz exposure may be evaluated at a particular separation distance (e.g., 10 mm, 15 mm, etc.) and particular device surface(s) (front, back, left, right, top, bottom, etc.) according to the DSI (or other device state), whereas the mmWave exposure may be evaluated at a 2 mm separation distance (e.g., normalized total RF exposure=normalized SAR @ DSI distance+normalized PD @ 2 mm distance), even if the wireless device is far away from the human body as indicated by the DSI, resulting in an overly conservative exposure assessment. If the device-based on information from one or more sensors (e.g., capacitive sensor, grip sensor, accelerometer, gyroscope, etc.) and/or other information (e.g., application information)—determines a device state with a larger separation distance (and specific device surface(s)) for SAR exposure, then technically, that distance (and device surface(s)) may also be used to account for a lower PD exposure. This lowered PD exposure may be determined by a ratio (DSI_mmW_factor=PD @ DSI_distance/PD @ 2 mm). However, since a finger can be next to a transceiver module—which may not be detected by sensors used for determining DSI (e.g., sensors may be capable of determining body position/separation from the device, but not finger position next to a mmWave module)—time-averaged mmW exposure may still be maintained within the PD @ 2 mm limit, for certain aspects.

The separation distance for each DSI (or other device state, or for each group or category of DSIs or device states) may be a predetermined or preset value, for example as dictated by a regulatory agency, as set by a device manufacturer, as determined based on testing of a device, etc. For example, as indicated above, a distance of 10 mm may be used when the device is detected as being used as a hotspot (e.g., based on an application or other software being executed on the device), and/or a distance of 15 mm may be used when the device is determined as being located near a user's trunk. Similarly, one or more particular device surfaces may be assessed for each device state (e.g., DSI) in some cases, as dictated by a regulatory agency, as set by a device manufacturer, as determined based on testing of a device, etc. For example, only the front surface may be assessed for head DSI, only the front and back surfaces may be assessed for body DSI, all surfaces (front, back, left, right, top, and bottom) may be assessed for hotspot DSI, etc.

In other examples, separation distance is determined based on measuring how far away a user is currently located in a particular device state (e.g., using radar or other signals emitted from and/or received at the device, such as based on a changing electric field associated with the device). In yet other examples, separation distance may vary based on the device state (e.g., DSI) and a type of sensor used to determine the device state. In one such example, when an accelerometer is used to determine that the device is in a particular state, an assumed distance is used (because the accelerometer may not be able to directly sense a user), whereas when a capacitive or proximity sensor is used to determine that the device is in a particular device state, the distance may be varied based on a measurement from the sensor (a measured distance, such as an actual separation distance). In some examples, a minimum distance is associated with one or more device states (e.g., one or more DSIs), and the minimum distance is used unless a sensor can reliably measure that a user is located a greater distance away.

Aspects of the present disclosure provide techniques and apparatus for utilizing device state information and handling the combined RF exposure from simultaneous transmission of sub-6 GHz radio and mmWave radio, without degrading the integrity of the mmWave RF exposure compliance. In other words, if human tissue is determined to be at a larger distance (e.g., based on DSI, other device state information, or distance measurement), then for certain aspects of the present disclosure, PD exposure can be scaled down for that distance (instead of for a fixed value, such as 2 mm) in real-time such that additional exposure margin can be gained for performance improvement. Similarly, if sub-6 GHz radio exposure is assessed only on a subset of device surfaces (e.g., based on DSI, other device state information, or distance measurement), then for certain aspects of the present disclosure, PD exposure can be scaled down for that subset of surfaces in real-time such that additional exposure margin can be gained for performance improvement. For example, in the case of head DSI, since only the front surface is assessed for sub-6 GHz radio exposure, PD exposure can be scaled down for the front surface only instead of using the worst-case surface (e.g., maximum PD out of all assessed surfaces, such as an example where the maximum PD out of the left, front, and back surfaces for mmWave module is located on the left edge of the wireless device).

In general, normalized total RF exposure=normalized SAR @ DSI_distance_subset_surfaces+DSI_mmW_factor*normalized PD @ 2 mm_worst_surface, where DSI_mmW_factor=PD @ DSI_distance_subset_surfaces/PD @ 2 mm_worst_surface (where the normalized total RF exposure is ≤1.0). Here, the "subset_surfaces" portion of "DSI_distance_subset_surfaces" considers only those device surfaces where sub-6 GHz radio exposure is evaluated for a given DSI, and the "worst_surface" is the maximum out of all surfaces where PD was assessed. For example, in a head DSI scenario, subset_surfaces={front} surface only at a 2 mm separation distance, and worst_surface=maximum PD out of {front, left, back} surfaces at 2 mm separation distance in the case of a mmWave module located on the left edge of the wireless device, resulting in DSI_mmW_factor=PD @ 2 mm_front_surface/maximum [PD @ 2 mm_{front, left, back} surfaces]. If multiple surfaces are present in subset_surfaces, then the maximum PD out of all surfaces in subset_surfaces is used in evaluating DSI_mmW_factor. For example, in a body DSI scenario, subset_surfaces={front, back} surfaces only at a 15 mm separation distance, and worst_surface=maximum PD out of {front, left, back} surfaces at a 2 mm separation distance in the case of a mmWave module located on the left edge of the wireless device, resulting in DSI_mmW_factor=maximum [PD @ 15 mm_{front, back} surfaces]/maximum [PD @ 2 mm_{front, left, back} surfaces].

Due to this ratio described above, DSI_mmW_factor may also be referred to as "DSI_mmW_ratio." For certain aspects using device state information (e.g., other than DSI), an analogous factor may be referred to as a "device state factor." Aspects of the present disclosure may apply this DSI_mmW_factor or device state factor in real-time to the PD exposure portion of total exposure (e.g., for simultaneous radio transmissions), but not for standalone mmW exposure, as described in detail below. It will be understood based on the examples described herein that the term "subset_surfaces" in the expressions above may include all surfaces of the wireless device or any other set of device surfaces. For example, the "subset_surfaces" in a hotspot DSI may include all surfaces.

Figure 5:
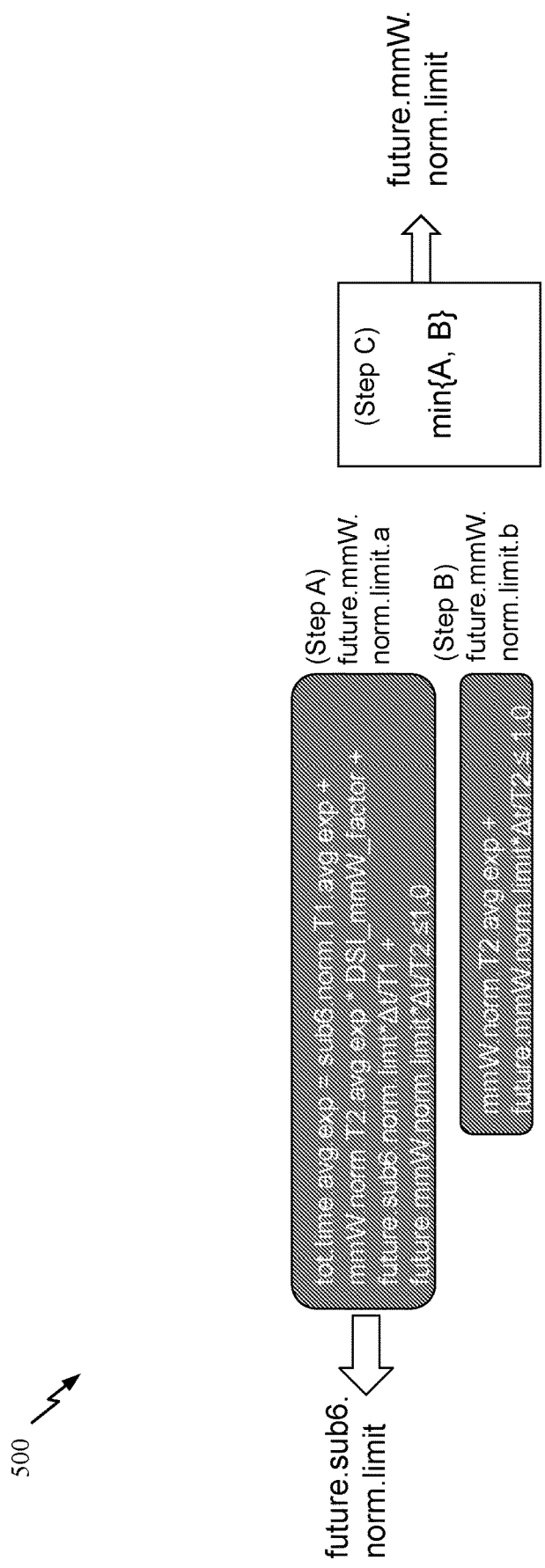
FIG. 5 illustrates an example algorithm for using device state index (DSI) information in a simultaneous radio transmission scenario to determine transmission power levels for complying with RF exposure limits, in accordance with certain aspects of the present disclosure.

FIG. 5 illustrates an example algorithm 500 for using device state (e.g., DSI) information in a simultaneous sub-6

GHz and mmW transmission scenario to determine transmission power levels for RF exposure compliance, in accordance with certain aspects of the present disclosure. This procedure may be used to maximize, or at least increase, the sub-6 GHz margin in sub-6+mmW scenarios by applying a DSI factor for Frequency Range 2 (FR2) while maintaining the integrity and robustness of mmW RF exposure compliance. The algorithm 500 may be performed, for example, by a wireless device (e.g., the UE 120 or a CPE).

In Step A, the device may calculate past time-averaged simultaneous RF exposure by scaling down the mmW exposure with a DSI_mmW_factor and adding the scaled-down result to the sub-6 RF exposure, according to Expression (11):

$$\text{tot.time.avg.exp} = \text{sub6.norm.T1.avg.exp} + \\ \text{mmW.norm.T2.avg.exp} * \text{DSI\_mmW\_factor} + \\ \text{future.sub6.norm.limit} * \Delta t / T1 + \\ \text{future.mmW.norm.limit.a} * \Delta t / T2 \leq 1.0 \quad (11)$$

where $\Delta t$ is a time interval, the past (T1−Δt) sub-6 RF exposure is averaged over a first time window $$T1 = \frac{\Delta t}{T1} \sum_{n=1}^{(T1/\Delta t - 1)} [sub6.norm.\exp(n)],$$

the past (T2−Δt) mmW RF exposure is averaged over a second time window $$T2 = \frac{\Delta t}{T2} \sum_{n=1}^{(T2/\Delta t - 1)} [mmW.norm.\exp(n)],$$

DSI_mmW_factor corresponds to the ratio of the mmW exposure at the distance (and/or subset of surfaces) defined for the DSI of the active sub-6 radio to the mmW exposure at a nominal distance (e.g., at 2 mm) defined for mmW, future.sub6.norm.limit is the normalized sub-6 RF exposure limit for the next future time interval $\Delta t$, and future.mmW.norm.limit.a is the normalized mmW RF exposure limit for the next future time interval $\Delta t$ from Step A. For example, in a case where the sub-6 DSI corresponds to a distance of 10 mm (and all surfaces of the wireless device are assessed), the DSI_mmW_factor=PD_at_10 mm/PD_at_2 mm. Since DSI can change over time (e.g., in every time interval $\Delta t$), "mmW.norm.T2.time.avg.exp*DSI_mmW_factor" in Expression (11) may be replaced in some cases with $$\frac{\Delta t}{T2} \sum_{n=1}^{(T2/\Delta t - 1)} [mmW.norm.\exp(n) * \text{DSI\_mmW\_factor}(n)].$$

With this information, the device may determine future.sub6.norm.limit and future.mmW.norm.limit.a for Step A for the next future time interval $\Delta t$ as shown in the algorithm 500. For example, the device may calculate the combined normalized distribution for the past, similar to what is described above (e.g., with respect to FIG. 4) using sub6.norm.T1.avg.exp+ mmW.norm.T2.avg.exp*DSI_mmW_factor and based thereon, allocate future transmission power for the two different radios. The device may apply future.sub6.norm.limit to sub-6 GHz radio transmissions for the future time interval $\Delta t$.

In Step B of the algorithm 500, the device may calculate the past time-averaged mmW RF exposure without the DSI_mmW_factor factor according to Expression (12):

$$\text{mmW.norm.T2.avg.exp} + \\ \text{future.mmW.norm.limit.b} * \Delta t / T2 \leq 1.0 \quad (12)$$

where mmW.norm.T2.avg.exp may be expressed as $$\frac{\Delta t}{T2} \sum_{n=1}^{(T2/\Delta t - 1)} [mmW.norm.\exp(n)]$$

and where future.mmW.norm.limit.b is the normalized mmW RF exposure limit for the next future time interval $\Delta t$ from Step B. Based on this calculation, the device may determine future.mmW.norm.limit.b for Step B for the next future time interval $\Delta t$ as shown in FIG. 5.

In Step C of the algorithm 500, the device may determine a final future.mmW.norm.limit for the next future time interval $\Delta t$ by taking the minimum of future.mmW.norm.limit.a from Step A and future.mmW.norm.limit.b from Step B. The device may then apply future.mmW.norm.limit from Step C to mmW radio transmissions for the future time interval $\Delta t$. In other words, the device may determine a transmit power limit for mmW transmissions based on future.mmW.norm.limit and mmW_Plimit.

In this manner, the sub-6 GHz margin may be increased in simultaneous sub-6 GHz and mmWave transmission scenarios by accounting for a lower mmWave exposure contribution to the total exposure in real time after applying the DSI_mmW_factor in Step A. In other words, instead of applying a static DSI_mmW_factor, the device may frequently (e.g., continuously or periodically, such as every $\Delta t$) determine and apply the DSI_mmW_factor in real time. For certain aspects, as explained above with respect to Steps B and C, the device may ensure the mmWave radio transmissions do not exceed the standalone mmWave exposure (e.g., exposure when a finger is present next to a mmWave module and/or antenna), and may also ensure mmWave exposure complies with total exposure in Step A by performing the minimum operation between the mmWave limits determined in Steps A and B at Step C.

For certain aspects, the DSI_mmW_factor (=PD @ DSI_distance_subset_surfaces/PD @ 2 mm_worst_surface) may be predetermined and stored in memory of the device, such that the DSI_mmW_factor may be applied in real time. The DSI_mmW_factor may be a function of, for example, transceiver module, frequency band, DSI (distance and device surface(s)), and/or beam identifier (e.g., magnitude/phase excitation of antenna elements in each transceiver module). In some cases, to avoid storing DSI_mmW_factor for all beams, the maximum (or another statistically defined) DSI_mmW_factor out of all (or at least a set of) beams may be stored for conservativeness and simplicity (e.g., store a "DSI_mmW_factor (module #, mmWave frequency band #, DSI #)" value for all supported transceiver modules/bands/DSIs and apply the corresponding factor in scaling down mmWave radio exposure). In other cases, DSI_mmW_factor may be stored for all beams.

In certain aspects, the time window (e.g., T1 and/or T2) may be in a range from 1 second to 360 seconds. For example, the time window may be 100 seconds or 360 seconds. The range from 1 second to 360 seconds is an example, and other suitable values for the time window may be used. In certain cases, the time window may be less than 1 second, such as 500 milliseconds. In certain cases, the time window may be greater than 360 seconds, such as 600 seconds.

In certain aspects, the transmission power levels for multiple radios may be determined based on a sum of (normalized) time-averaged RF exposures for simultaneous radio transmissions being less than or equal to a threshold (e.g., 1.0). For example, the wireless device may transmit the signals at the transmission power levels based on a sum of (normalized) time-averaged RF exposures for the simultaneous radio transmissions being less than or equal to a threshold. In some such scenarios, a backoff factor may be applied to the RF exposures for each of the radios in the case of the sum of time-averaged RF exposures.

In certain aspects, the transmit antennas may include one or more first antennas configured to transmit in a first mode and one or more second antennas configured to transmit in a second mode. In certain cases, the first mode may be transmitting at one or more frequencies below 6 GHz (e.g., at sub-6 GHz bands), and the second mode may be transmitting at one or more frequencies above 6 GHz (e.g., at mmWave bands). In other cases, the first mode may be transmitting at one or more frequencies above 6 GHz, and the second mode may be transmitting at one or more frequencies below 6 GHz.

Example Operations for Wireless Communications

Figure 6:
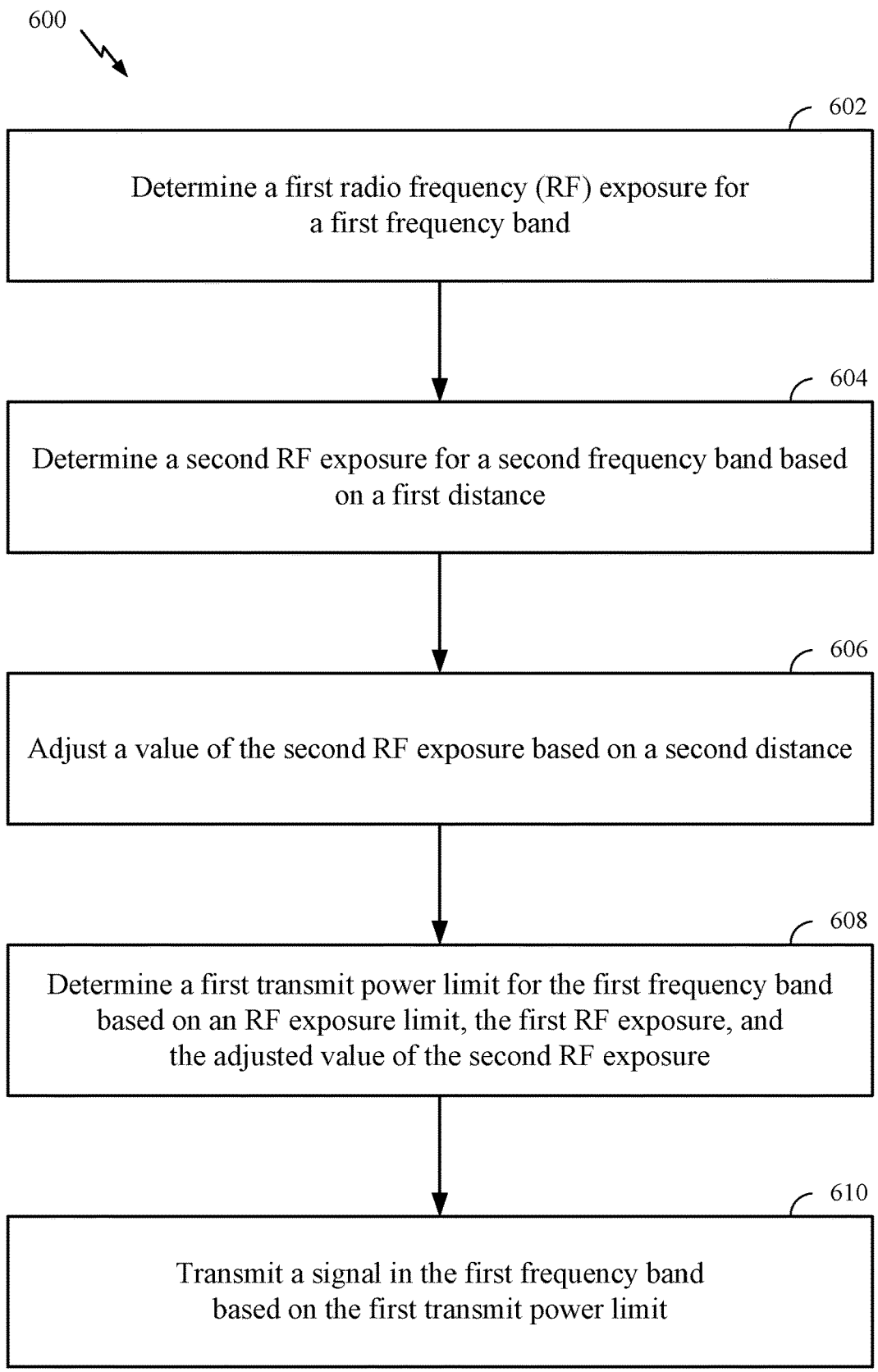
FIG. 6 is a flow diagram illustrating example operations for wireless communication by a wireless device, in accordance with certain aspects of the present disclosure.

FIG. 6 is a flow diagram illustrating example operations 600 for wireless communication, in accordance with certain aspects of the present disclosure. The operations 600 may be performed, for example, by a wireless device (e.g., the UE 120a in the wireless communication network 100). The operations 600 may be implemented as software components that are executed and run on one or more processors e.g., controller/processor 280 of FIG. 2). Further, the transmission of signals by the wireless device in the operations 600 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 600 may optionally begin, at block 602, with the wireless device determining a first radio frequency (RF) exposure (e.g., a SAR exposure, such as sub6.norm.T1.avg.exp) for a first frequency band (e.g., a sub-6 GHz band). At block 604, the wireless device may determine a second RF exposure (e.g., a PD exposure, such as mmW.norm.T2.avg.exp) for a second frequency band (e.g., a mmW band) based on a first distance. At block 606, the wireless device may adjust a value of the second RF exposure based on a second distance. For certain aspects, the second distance may be different from the first distance. At block 608, the wireless device may determine a first transmit power limit (e.g., future.sub6.norm.limit) for the first frequency band based on an RF exposure limit (e.g., a normalized threshold≤1.0), the first RF exposure (e.g.), and the adjusted value of the second RF exposure (e.g., mmW.norm.T2.avg.exp*DSI_mmW_factor). At block 610, the wireless device may transmit a signal in the first frequency band based on the first transmit power limit.

According to certain aspects, determining the first RF exposure at block 602 involves determining the first RF exposure for the first frequency band based on a third distance. The third distance may be an assumed separation distance between the wireless device and a user of the wireless device for the first frequency band (even when the user is not physically present), wherein the assumed separation distance may be based on a state of the wireless device and/or regulations. For certain aspects, the state of the wireless device includes a device state index (DSI). In this case, the second distance may equal the third distance as defined for the DSI of the wireless device for the first frequency band. In some examples, the first distance is a nominal defined distance (e.g., 2 mm for a PD exposure) for the second frequency band. For certain aspects, the second distance equals the third distance.

According to certain aspects, the operations 600 further involve sensing the second distance with a sensor of the wireless device. In this case, the second distance may be an actual separation distance between the wireless device and a user of the wireless device. Furthermore, the first distance may be a nominal defined distance (e.g., 2 mm) for the second frequency band.

According to certain aspects, the first distance is a nominal defined distance (e.g., 2 mm) for the second frequency band. In this case, the adjusting at block 606 may involve multiplying the value of the second RF exposure by a factor (e.g., DSI_mmW_factor or device state ratio) based on a ratio of a predetermined exposure for the second frequency band for the second distance to a predetermined exposure for the second frequency band for the nominal defined distance. Furthermore, the second distance may be based on a separation distance (e.g., an assumed or an actual separation distance) between the wireless device and a user of the wireless device.

According to certain aspects, the adjusting at block 606 includes multiplying the value of the second RF exposure by a factor (e.g., device state factor or DSI_mmW_factor) based on the second distance. In this case, the first distance may be a nominal defined distance (e.g., 2 mm) for the second frequency band. Furthermore, the second distance may be based on a separation distance (e.g., an assumed or an actual separation distance) between the wireless device and a user of the wireless device.

According to certain aspects, the operations 600 further involve determining a second transmit power limit (e.g., future.mmW.norm.limit.a) for the second frequency band based on the RF exposure limit, the first RF exposure, and the adjusted value of the second RF exposure. In some cases, the operations 600 may further include determining a third transmit power limit (e.g., future.sub6.norm.limit.b) for the second frequency band based on the RF exposure limit and the second RF exposure without the adjustment and transmitting a signal in the second frequency band according to a smaller of the second transmit power limit and the third transmit power limit. For certain aspects, transmitting the signal in the second frequency band involves concurrently transmitting the signal in the second frequency band in a same time interval (e.g., a next future time interval) as transmitting the signal in the first frequency band. In some examples, the time intervals for the first frequency band and the second frequency band have different lengths. In such examples, a future time interval for the first frequency band may therefore be different form a future time interval for a second frequency band, but transmission of signals in the first and second frequency bands in their respective time intervals may overlap or otherwise be at least partially concurrent.

According to certain aspects, the first frequency band is a sub-6 GHz frequency band. In this case, the second frequency band may be a millimeter wave (mmW) frequency band.

According to certain aspects, determining the first transmit power limit at block 608 involves determining the first transmit power limit for the first frequency band for a time interval in the future, based on the RF exposure limit, the first RF exposure, and the adjusted value of the second RF exposure. In this case, transmitting at block 610 may include transmitting the signal in the first frequency band during the time interval, based on the first transmit power limit.

According to certain aspects, the first RF exposure is time-averaged over a first time window minus a time interval (e.g., T1−Δt), and the second RF exposure is time-averaged over a second time window minus the time interval (e.g., T2−Δt). In this case, the first transmit power limit may be determined for the time interval, the time interval may be a future time interval, and the transmitting at block 610 may include transmitting the signal in the first frequency band, during the future time interval, based on the first transmit power limit. For certain aspects, the first RF exposure is normalized by a first maximum allowable average transmission power limit for the first frequency band (e.g., sub6_Plimit), the second RF exposure is normalized by a second maximum allowable average transmission power limit for the second frequency band (e.g., mmW_Plimit), and the RF exposure limit is normalized to a value no greater than 1.0.

According to certain aspects, determining the second RF exposure at block 604 involves determining the second RF exposure for the second frequency band based on a first set of device surfaces at the first distance. In this case, the adjusting at block 606 may include adjusting the value of the second RF exposure based on a second set of device surfaces at the second distance. For certain aspects, determining the first RF exposure involves determining the first RF exposure for the first frequency band based on a third set of device surfaces at a third distance; the third distance is an assumed separation distance between the wireless device and a user of the wireless device, based on a state of the wireless device; and the third set of device surfaces is predefined based on the state of the wireless device. In this case, the state of the wireless device may include a device state index (DSI), and the second distance may equal the third distance as defined for the DSI of the wireless device for the first frequency band. For certain aspects, the first distance is a nominal defined distance (e.g., 2 mm for PD exposure) for the second frequency band, and the adjusting at block 606 involves multiplying the value of the second RF exposure by a factor (e.g., DSI_mmW_factor) based on a ratio of a predetermined exposure for the second frequency band for the second set of device surfaces at the second distance to a predetermined exposure for the second frequency band for the first set of device surfaces at the nominal defined distance. In this case, the predetermined exposure for the second frequency band for the first set of device surfaces at the nominal defined distance may be the maximum of a set of predetermined exposures for the second frequency band for the first set of device surfaces at the nominal defined distance (e.g., PD @ 2 mm_worst_surface). Furthermore, the predetermined exposure for the second frequency band for the second set of device surfaces at the second distance may be the maximum of a set of predetermined exposures for the second frequency band for the second set of device surfaces at the second distance (e.g., PD @ DSI_distance_subset_surfaces).

Example Communications Device

Figure 7:
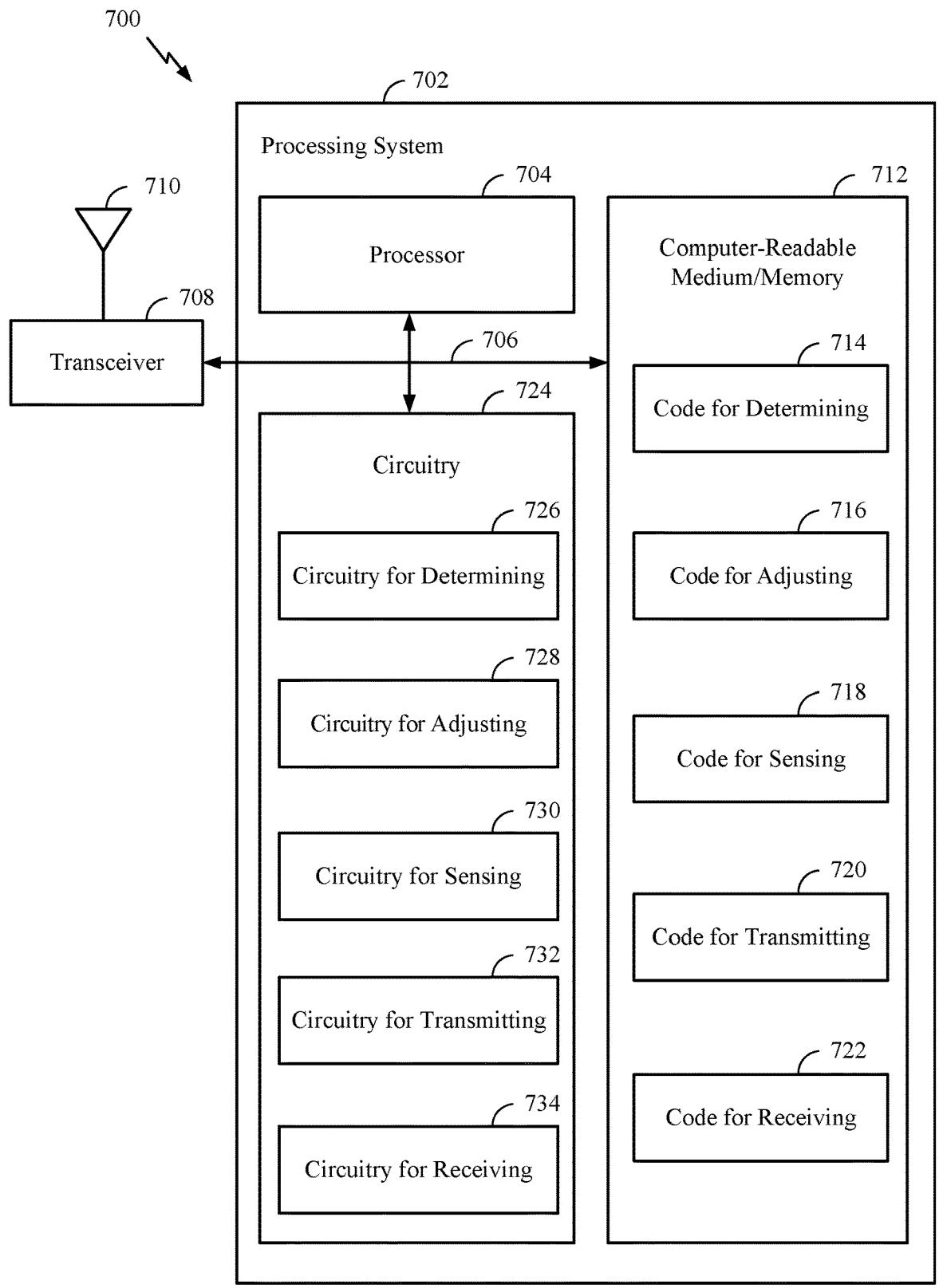
FIG. 7 illustrates a communications device (e.g., a UE) that may include various components configured to perform operations for the techniques disclosed herein, in accordance with certain aspects of the present disclosure.

FIG. 7 illustrates a communications device 700 (e.g., the UE 120) that may include various components (e.g., corresponding to means-plus-function components) configured to perform operations for the techniques disclosed herein, such as the operations illustrated in the Figures. The communications device 700 includes a processing system 702, which may be coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in the Figures, or other operations for performing the various techniques discussed herein for providing RF exposure compliance. In certain aspects, computer-readable medium/memory 712 stores code for determining 714, code for adjusting 716, code for sensing 718, code for transmitting 720, and/or code for receiving (or obtaining) 722. In certain aspects, the processing system 702 has circuitry 724 configured to implement the code stored in the computer-readable medium/memory 712. In certain aspects, the circuitry 724 is coupled to the processor 704 and/or the computer-readable medium/memory 712 via the bus 706. For example, the circuitry 724 includes circuitry for determining 726, circuitry for adjusting 728, circuitry for sensing 730, circuitry for transmitting 732, and/or circuitry for receiving (or obtaining) 734.

Example Aspects

In addition to the various aspects described above, specific combinations of aspects are within the scope of the disclosure, some of which are detailed below:

Aspect 1: A method of wireless communication by a wireless device, comprising: determining a first radio frequency (RF) exposure for a first frequency band; determining a second RF exposure for a second frequency band based on a first distance; adjusting a value of the second RF exposure based on a second distance; determining a first transmit power limit for the first frequency band based on an RF exposure limit, the first RF exposure, and the adjusted value of the second RF exposure; and transmitting a signal in the first frequency band based on the first transmit power limit.

Aspect 2: The method of Aspect 1, wherein determining the first RF exposure comprises determining the first RF exposure for the first frequency band based on a third distance, wherein the third distance is an assumed separation distance between the wireless device and a user of the wireless device for the first frequency band, and wherein the assumed separation distance is based on a state of the wireless device.

Aspect 3: The method of Aspect 2, wherein the state of the wireless device comprises a device state index (DSI).

Aspect 4: The method of Aspect 3, wherein the second distance equals the third distance as defined for the DSI of the wireless device for the first frequency band.

Aspect 5: The method of any of Aspects 2 to 4, wherein the first distance is a nominal defined distance for the second frequency band and wherein the second distance equals the third distance.

Aspect 6: The method of any of Aspects 1 to 5, further comprising sensing the second distance with a sensor of the wireless device, wherein the first distance is a nominal defined distance for the second frequency band and wherein the second distance is an actual separation distance between the wireless device and a user of the wireless device.

Aspect 7: The method of any of Aspects 1 to 6, wherein: the first distance is a nominal defined distance for the second frequency band; the second distance is based on a separation distance between the wireless device and a user of the wireless device; and the adjusting comprises multiplying the value of the second RF exposure by a factor based on a ratio of a predetermined exposure for the second frequency band for the second distance to a predetermined exposure for the second frequency band for the nominal defined distance.

Aspect 8: The method of any of Aspects 1 to 6, wherein the adjusting comprises multiplying the value of the second RF exposure by a factor based on the second distance, wherein the first distance is a nominal defined distance for the second frequency band, and wherein the second distance is based on a separation distance between the wireless device and a user of the wireless device.

Aspect 9: The method of any of Aspects 1 to 8, further comprising determining a second transmit power limit for the second frequency band based on the RF exposure limit, the first RF exposure, and the adjusted value of the second RF exposure.

Aspect 10: The method of Aspect 9, further comprising: determining a third transmit power limit for the second frequency band based on the RF exposure limit and the second RF exposure without the adjustment; and transmitting a signal in the second frequency band according to a smaller of the second transmit power limit and the third transmit power limit.

Aspect 11: The method of Aspect 10, wherein transmitting the signal in the second frequency band comprises concurrently transmitting the signal in the second frequency band in a same time interval as transmitting the signal in the first frequency band.

Aspect 12: The method of any of Aspects 1 to 11, wherein the first frequency band is a sub-6 GHz frequency band and wherein the second frequency band is a millimeter wave (mmW) frequency band.

Aspect 13: The method of any of Aspects 1 to 12, wherein: determining the first transmit power limit comprises determining the first transmit power limit for the first frequency band for a time interval in the future, based on the RF exposure limit, the first RF exposure, and the adjusted value of the second RF exposure; and the transmitting comprises transmitting the signal in the first frequency band during the time interval, based on the first transmit power limit.

Aspect 14: The method of any of Aspects 1 to 12, wherein the first RF exposure is time-averaged over a first time window minus a time interval, wherein the second RF exposure is time-averaged over a second time window minus the time interval, wherein the first transmit power limit is determined for the time interval, wherein the time interval is a future time interval, and wherein the transmitting comprises transmitting the signal in the first frequency band, during the future time interval, based on the first transmit power limit.

Aspect 15: The method of Aspect 14, wherein the first RF exposure is normalized by a first maximum allowable average transmission power limit for the first frequency band, wherein the second RF exposure is normalized by a second maximum allowable average transmission power limit for the second frequency band, and wherein the RF exposure limit is normalized to a value no greater than 1.

Aspect 16: The method of any of Aspects 1 to 15, wherein: determining the second RF exposure comprises determining the second RF exposure for the second frequency band based on a first set of device surfaces at the first distance; and the adjusting comprises adjusting the value of the second RF exposure based on a second set of device surfaces at the second distance.

Aspect 17: The method of Aspect 16, wherein: determining the first RF exposure comprises determining the first RF exposure for the first frequency band based on a third set of device surfaces at a third distance; the third distance is an assumed separation distance between the wireless device and a user of the wireless device, based on a state of the wireless device; and the third set of device surfaces is predefined based on the state of the wireless device.

Aspect 18: The method of Aspect 17, wherein the state of the wireless device comprises a device state index (DSI) and wherein the second distance equals the third distance as defined for the DSI of the wireless device for the first frequency band.

Aspect 19: The method of any of Aspects 16 to 18, wherein: the first distance is a nominal defined distance for the second frequency band; and the adjusting comprises multiplying the value of the second RF exposure by a factor based on a ratio of a predetermined exposure for the second frequency band for the second set of device surfaces at the second distance to a predetermined exposure for the second frequency band for the first set of device surfaces at the nominal defined distance.

Aspect 20: The method of Aspect 19, wherein the predetermined exposure for the second frequency band for the first set of device surfaces at the nominal defined distance is the maximum of a set of predetermined exposures for the second frequency band for the first set of device surfaces at the nominal defined distance.

Aspect 21: The method of Aspect 19 or 20, wherein the predetermined exposure for the second frequency band for the second set of device surfaces at the second distance is the maximum of a set of predetermined exposures for the second frequency band for the second set of device surfaces at the second distance.

Aspect 22: An apparatus for wireless communication, comprising: a memory; at least one processor coupled to the memory, the at least one processor being configured to: determine a first radio frequency (RF) exposure for a first frequency band; determine a second RF exposure for a second frequency band based on a first distance; adjust a value of the second RF exposure based on a second distance; and determine a first transmit power limit for the first frequency band based on an RF exposure limit, the first RF exposure, and the adjusted value of the second RF exposure; and a transmitter configured to transmit a signal in the first frequency band based on the first transmit power limit.

Aspect 23: The apparatus of Aspect 22, wherein the at least one processor is configured to determine the first RF exposure for the first frequency band based on a third distance, wherein the third distance is an assumed separation distance between the apparatus and a user of the apparatus for the first frequency band, and wherein the assumed separation distance is based on a state of the apparatus.

Aspect 24: The apparatus of Aspect 22 or 23, wherein: the first distance is a nominal defined distance for the second frequency band; the second distance is based on a separation distance between the apparatus and a user of the apparatus; and the at least one processor, in order to adjust the value of the second RF exposure, is configured to multiply the value of the second RF exposure by a factor based on a ratio of a predetermined exposure for the second frequency band for the second distance to a predetermined exposure for the second frequency band for the nominal defined distance.

Aspect 25: The apparatus of any of Aspects 22 to 24, wherein the at least one processor is further configured to: determine a second transmit power limit for the second frequency band based on the RF exposure limit, the first RF exposure, and the adjusted value of the second RF exposure; and determine a third transmit power limit for the second frequency band based on the RF exposure limit and the second RF exposure without the adjustment, wherein the transmitter is further configured to transmit a signal in the second frequency band according to a smaller of the second transmit power limit and the third transmit power limit.

Aspect 26: The apparatus of any of Aspects 22 to 25, wherein: the at least one processor, in order to determine the second RF exposure, is configured to determine the second RF exposure for the second frequency band based on a first set of device surfaces at the first distance; and the at least one processor, in order to adjust the value of the second RF exposure, is configured to adjust the value of the second RF exposure based on a second set of device surfaces at the second distance.

Aspect 27: The apparatus of Aspect 26, wherein: the at least one processor, in order to determine the first RF exposure, is configured to determine the first RF exposure for the first frequency band based on a third set of device surfaces at a third distance; the third distance is an assumed separation distance between the apparatus and a user of the apparatus, based on a state of the apparatus; and the third set of device surfaces is predefined based on the state of the apparatus.

Aspect 28: The apparatus of Aspect 26 or 27, wherein: the first distance is a nominal defined distance for the second frequency band; and the at least one processor, in order to adjust the value of the second RF exposure, is configured to multiply the value of the second RF exposure by a factor based on a ratio of a predetermined exposure for the second frequency band for the second set of device surfaces at the second distance to a predetermined exposure for the second frequency band for the first set of device surfaces at the nominal defined distance.

Aspect 29: The apparatus of Aspect 28, wherein: the predetermined exposure for the second frequency band for the first set of device surfaces at the nominal defined distance is the maximum of a set of predetermined exposures for the second frequency band for the first set of device surfaces at the nominal defined distance; and the predetermined exposure for the second frequency band for the second set of device surfaces at the second distance is the maximum of a set of predetermined exposures for the second frequency band for the second set of device surfaces at the second distance.

Aspect 30: An apparatus for wireless communication, comprising: means for determining a first radio frequency (RF) exposure for a first frequency band; means for determining a second RF exposure for a second frequency band based on a first distance; means for adjusting a value of the second RF exposure based on a second distance; means for determining a first transmit power limit for the first frequency band based on an RF exposure limit, the first RF exposure, and the adjusted value of the second RF exposure; and means for transmitting a signal in the first frequency band based on the first transmit power limit.

Aspect 31: An apparatus for wireless communication, comprising: a memory, at least one processor coupled to the memory, and a transmitter coupled to the at least one processor, the memory, the at least one processor, and the transmitter, being configured to perform any of Aspects 1 to 21.

Aspect 32: An apparatus comprising means for performing any of Aspects 1 to 21.

Aspect 33: A computer-readable medium having instructions stored thereon to perform any of Aspects 1 to 21.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in the figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:
determining a first radio frequency (RF) exposure for a first frequency band;
determining a second RF exposure for a second frequency band based on a first distance;
adjusting a value of the second RF exposure based on a second distance;
determining a first transmit power limit for the first frequency band based on an RF exposure limit, the first RF exposure, and the adjusted value of the second RF exposure; and
transmitting a signal in the first frequency band based on the first transmit power limit.

2. The method of claim 1, wherein determining the first RF exposure comprises determining the first RF exposure for the first frequency band based on a third distance, wherein the third distance is an assumed separation distance between the wireless device and a user of the wireless device for the first frequency band, and wherein the assumed separation distance is based on a state of the wireless device.

3. The method of claim 2, wherein the state of the wireless device comprises a device state index (DSI).

4. The method of claim 3, wherein the second distance equals the third distance as defined for the DSI of the wireless device for the first frequency band.

5. The method of claim 2, wherein the first distance is a nominal defined distance for the second frequency band and wherein the second distance equals the third distance.

6. The method of claim 1, further comprising sensing the second distance with a sensor of the wireless device, wherein the first distance is a nominal defined distance for the second frequency band and wherein the second distance is an actual separation distance between the wireless device and a user of the wireless device.

7. The method of claim 1, wherein:
the first distance is a nominal defined distance for the second frequency band;
the second distance is based on a separation distance between the wireless device and a user of the wireless device; and
the adjusting comprises multiplying the value of the second RF exposure by a factor based on a ratio of a predetermined exposure for the second frequency band for the second distance to a predetermined exposure for the second frequency band for the nominal defined distance.

8. The method of claim 1, wherein the adjusting comprises multiplying the value of the second RF exposure by a factor based on the second distance, wherein the first distance is a nominal defined distance for the second frequency band, and wherein the second distance is based on a separation distance between the wireless device and a user of the wireless device.

9. The method of claim 1, further comprising determining a second transmit power limit for the second frequency band based on the RF exposure limit, the first RF exposure, and the adjusted value of the second RF exposure.

10. The method of claim 9, further comprising:
determining a third transmit power limit for the second frequency band based on the RF exposure limit and the second RF exposure without the adjustment; and
transmitting a signal in the second frequency band according to a smaller of the second transmit power limit and the third transmit power limit.

11. The method of claim 10, wherein transmitting the signal in the second frequency band comprises concurrently transmitting the signal in the second frequency band in a same time interval as transmitting the signal in the first frequency band.

12. The method of claim 1, wherein the first frequency band is a sub-6 GHz frequency band and wherein the second frequency band is a millimeter wave (mmW) frequency band.

13. The method of claim 1, wherein:
determining the first transmit power limit comprises determining the first transmit power limit for the first frequency band for a time interval in the future, based on the RF exposure limit, the first RF exposure, and the adjusted value of the second RF exposure; and
the transmitting comprises transmitting the signal in the first frequency band during the time interval, based on the first transmit power limit.

14. The method of claim 1, wherein the first RF exposure is time-averaged over a first time window minus a time interval, wherein the second RF exposure is time-averaged over a second time window minus the time interval, wherein the first transmit power limit is determined for the time interval, wherein the time interval is a future time interval, and wherein the transmitting comprises transmitting the signal in the first frequency band, during the future time interval, based on the first transmit power limit.

15. The method of claim 14, wherein the first RF exposure is normalized by a first maximum allowable average transmission power limit for the first frequency band, wherein the second RF exposure is normalized by a second maximum allowable average transmission power limit for the second frequency band, and wherein the RF exposure limit is normalized to a value no greater than 1.

16. The method of claim 1, wherein:
determining the second RF exposure comprises determining the second RF exposure for the second frequency band based on a first set of device surfaces at the first distance; and
the adjusting comprises adjusting the value of the second RF exposure based on a second set of device surfaces at the second distance.

17. The method of claim 16, wherein:
determining the first RF exposure comprises determining the first RF exposure for the first frequency band based on a third set of device surfaces at a third distance;
the third distance is an assumed separation distance between the wireless device and a user of the wireless device, based on a state of the wireless device; and
the third set of device surfaces is predefined based on the state of the wireless device.

18. The method of claim 17, wherein the state of the wireless device comprises a device state index (DSI) and wherein the second distance equals the third distance as defined for the DSI of the wireless device for the first frequency band.

19. The method of claim 16, wherein:
the first distance is a nominal defined distance for the second frequency band; and
the adjusting comprises multiplying the value of the second RF exposure by a factor based on a ratio of a predetermined exposure for the second frequency band for the second set of device surfaces at the second distance to a predetermined exposure for the second frequency band for the first set of device surfaces at the nominal defined distance.

20. The method of claim 19, wherein the predetermined exposure for the second frequency band for the first set of device surfaces at the nominal defined distance is the maximum of a set of predetermined exposures for the second frequency band for the first set of device surfaces at the nominal defined distance.

21. The method of claim 19, wherein the predetermined exposure for the second frequency band for the second set of device surfaces at the second distance is the maximum of a set of predetermined exposures for the second frequency band for the second set of device surfaces at the second distance.

22. An apparatus for wireless communication, comprising:
a memory;
at least one processor coupled to the memory, the at least one processor being configured to:
determine a first radio frequency (RF) exposure for a first frequency band;
determine a second RF exposure for a second frequency band based on a first distance;
adjust a value of the second RF exposure based on a second distance; and
determine a first transmit power limit for the first frequency band based on an RF exposure limit, the first RF exposure, and the adjusted value of the second RF exposure; and a transmitter configured to transmit a signal in the first frequency band based on the first transmit power limit.

23. The apparatus of claim 22, wherein the at least one processor is configured to determine the first RF exposure for the first frequency band based on a third distance wherein the third distance is an assumed separation distance between the apparatus and a user of the apparatus for the first frequency band, and wherein the assumed separation distance is based on a state of the apparatus.

24. The apparatus of claim 22, wherein:
the first distance is a nominal defined distance for the second frequency band;
the second distance is based on a separation distance between the apparatus and a user of the apparatus; and
the at least one processor, in order to adjust the value of the second RF exposure, is configured to multiply the value of the second RF exposure by a factor based on a ratio of a predetermined exposure for the second frequency band for the second distance to a predetermined exposure for the second frequency band for the nominal defined distance.

25. The apparatus of claim 22, wherein the at least one processor is further configured to:
determine a second transmit power limit for the second frequency band based on the RF exposure limit, the first RF exposure, and the adjusted value of the second RF exposure; and
determine a third transmit power limit for the second frequency band based on the RF exposure limit and the second RF exposure without the adjustment, wherein the transmitter is further configured to transmit a signal in the second frequency band according to a smaller of the second transmit power limit and the third transmit power limit.

26. The apparatus of claim 22, wherein:
the at least one processor, in order to determine the second RF exposure, is configured to determine the second RF exposure for the second frequency band based on a first set of device surfaces at the first distance; and
the at least one processor, in order to adjust the value of the second RF exposure, is configured to adjust the value of the second RF exposure based on a second set of device surfaces at the second distance.

27. The apparatus of claim 26, wherein:
the at least one processor, in order to determine the first RF exposure, is configured to determine the first RF exposure for the first frequency band based on a third set of device surfaces at a third distance;
the third distance is an assumed separation distance between the apparatus and a user of the apparatus, based on a state of the apparatus; and
the third set of device surfaces is predefined based on the state of the apparatus.

28. The apparatus of claim 26, wherein:
the first distance is a nominal defined distance for the second frequency band; and
the at least one processor, in order to adjust the value of the second RF exposure, is configured to multiply the value of the second RF exposure by a factor based on a ratio of a predetermined exposure for the second frequency band for the second set of device surfaces at the second distance to a predetermined exposure for the second frequency band for the first set of device surfaces at the nominal defined distance.

29. The apparatus of claim 28, wherein:
the predetermined exposure for the second frequency band for the first set of device surfaces at the nominal defined distance is the maximum of a set of predetermined exposures for the second frequency band for the first set of device surfaces at the nominal defined distance; and
the predetermined exposure for the second frequency band for the second set of device surfaces at the second distance is the maximum of a set of predetermined exposures for the second frequency band for the second set of device surfaces at the second distance.

30. An apparatus for wireless communication, comprising:
means for determining a first radio frequency (RF) exposure for a first frequency band;
means for determining a second RF exposure for a second frequency band based on a first distance;
means for adjusting a value of the second RF exposure based on a second distance;
means for determining a first transmit power limit for the first frequency band based on an RF exposure limit, the first RF exposure, and the adjusted value of the second RF exposure; and
means for transmitting a signal in the first frequency band based on the first transmit power limit.

* * * * *